United States Patent

[11] 3,599,269

| [72] | Inventor | R. J. Max Congdon |
| | | 0-1421 Baldwin, Jenison, Mich. |
| [21] | Appl. No. | 770,502 |
| [22] | Filed | Oct. 25, 1968 |
| [45] | Patented | Aug. 17, 1971 |

[54] HEADLIGHT-CLEANING APPARATUS
5 Claims, 7 Drawing Figs.

[52] U.S. Cl. .................................................. 15/250.04,
15/250.27, 15/250.3
[51] Int. Cl. .................................................. B60s 1/66
[50] Field of Search .................................. 15/250.01,
250.02, 250.03, 250.04, 250.27; 240/7.1

[56] References Cited
UNITED STATES PATENTS

| 1,768,329 | 6/1930 | Oishei | 15/250.27 |
| 2,334,508 | 11/1943 | Purden | 15/250.01 X |
| 2,336,007 | 12/1943 | Fuller | 15/250.04 |
| 3,058,142 | 10/1962 | Pollock | 15/250.02 |
| 3,082,462 | 3/1963 | Barenyi | 15/250.3 |
| 3,493,804 | 2/1970 | Fennell | 15/250.01 X |
| 3,418,676 | 12/1968 | Byczkowski et al. | 15/250.04 |
| 3,456,278 | 7/1969 | Mandy et al. | 15/250.02 |

FOREIGN PATENTS

| 427,534 | 6/1967 | Switzerland | 15/250.04 |

*Primary Examiner*—Peter Feldman
*Attorney*—Price, Heneveld, Huizenga & Cooper

ABSTRACT: Resilient wiper blade elements carried by a portion of a reciprocably mounted frame which projects forwardly of the face or front wall of a headlight on an automobile or the like, with a fluid-transfer conduit carried by the frame and communicating with the wiper, and with the wiper arranged to apply cleaning fluid to the face of the headlight while simultaneously reciprocating across the same to clean it.

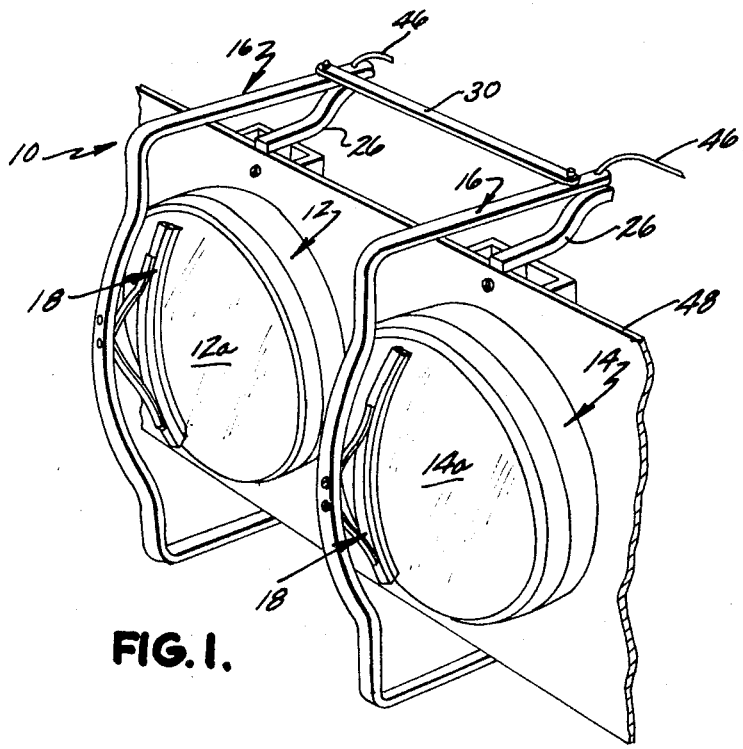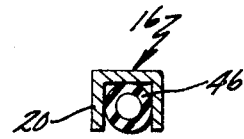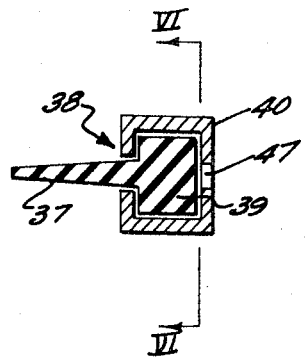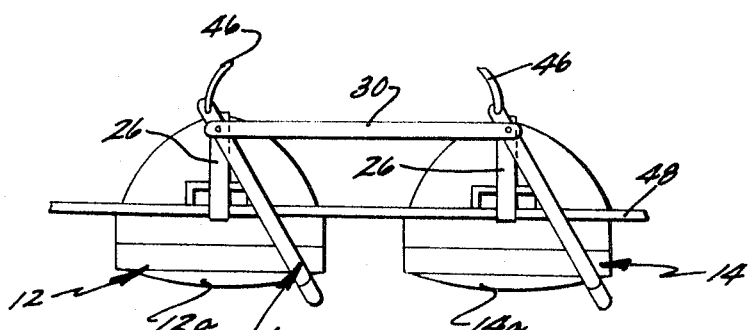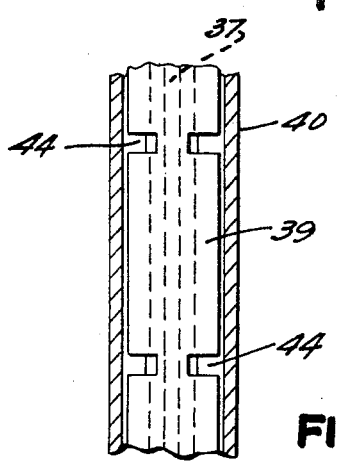
INVENTOR.
R.J. MAX CONGDON
ATTORNEYS

INVENTOR.
R.J. MAX CONGDON

ATTORNEYS 3,599,269

HEADLIGHT-CLEANING APPARATUS

BACKGROUND

As is well known to persons having even moderate amounts of automobile driving experience, the headlights on automobiles collect sizeable coatings of dirt and road grime during normal driving conditions, and particularly so in those regions which are subject to either regular rainfall or winter conditions where the streets are often filled with a salty slush mixture. Also, it is readily observable that the operating efficiency and overall usefulness of headlights decrease markedly when the outer face or lens of the light is coated with dirt, slush, or the like. In fact, with headlights fouled in this manner, country or highway driving is practically impossible, because so little of the light produced by the headlight is actually radiated beyond the automobile and onto the roadway. Indeed, even city driving, where the streets are relatively well lighted, may become difficult and unsafe, due to the inability of the driver to clearly see in front of his car.

Although the aforementioned problems have existed for many years and are acknowledged by automotive safety experts as a significant cause of driving accidents, nothing of a concrete or positive nature has yet been proposed for resolving this problem, except to admonish drivers that they should have their headlights cleaned regularly and often when driving under adverse conditions, a service which many gasoline stations have implemented as one of their customary convenience features.

Thus, it has remained for the present inventor to come forth with a constructive and a concrete approach for the automatic cleaning of headlights for automobiles and the like, by which all headlights on an automobile may be simultaneously cleaned without effort on the part of the driver, and in a safe and effective way which allows the automobile to continue in traffic or on the roadway without necessitating any service stop.

THE PRESENT INVENTION

The present invention has as its concept the fundamental underlying idea of automatic headlight cleaning at the command of the driver and under his control. The invention provides a device for achieving these results in an efficient and effective manner, and with a minimum of mechanical complexity.

Summarily and briefly stated, the present invention provides headlight wiper means carried by a frame so as to extend in front of the face or outer wall of the headlight element, with the wiper means including resilient wiper elements mounted for reciprocation across the face of the headlights, and with the apparatus including means for applying cleaning fluid to the outer face of the headlight, so that the resilient wiper elements may, in concert with the cleaning fluid, wipe the accumulated dirt and grime from the headlight face, leaving it clean for maximum headlight efficiency.

IN THE DRAWINGS

FIG. 1 is an enlarged frontal perspective view showing an installation of the apparatus in a typical automotive environment;

FIG. 2 is a top view of the apparatus seen in FIG. 1;

FIG. 4 is an enlarged vertical cross section of the frame, taken through the plane IV–IV of FIG. 3;

FIG. 5 is a greatly enlarged sectional plan view taken through the plane V–V of FIG. 3;

FIG. 6 is a fragmentary sectional elevation taken along the vertical plane VI–VI of FIG. 5.

PREFERRED EMBODIMENT

Figure 7:
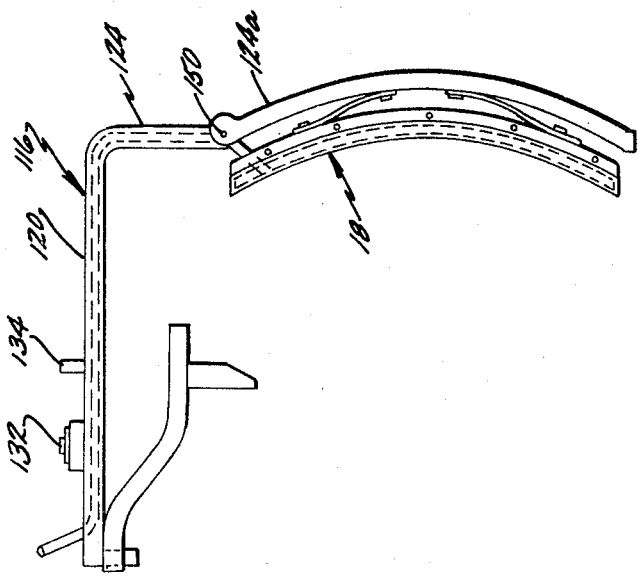
FIG. 7 is an enlarged side elevation similar to FIG. 4 but showing a modified embodiment of the apparatus.

While it is contemplated that the apparatus of the invention can be used in conjunction with practically any headlight or similar device, and in practically any position, it will be noted that in FIG. 1 the apparatus 10 is illustrated in conjunction with a pair of closely spaced headlights 12 and 14, such as is customarily found in present times on each side of the front of an automobile, there being a total of four such lights on most present automobiles. As is generally illustrated in FIG. 1, the apparatus 10 includes a pair of generally individual interconnected frames 16 (which are identical, and which therefor carry the same numeral). As will be seen, each of the frames 16 carries a wiper means 18, by which the outer face or lenslike wall 12a, 14a of the headlights 12, 14, respectively, is to be cleaned.

Figure 3:
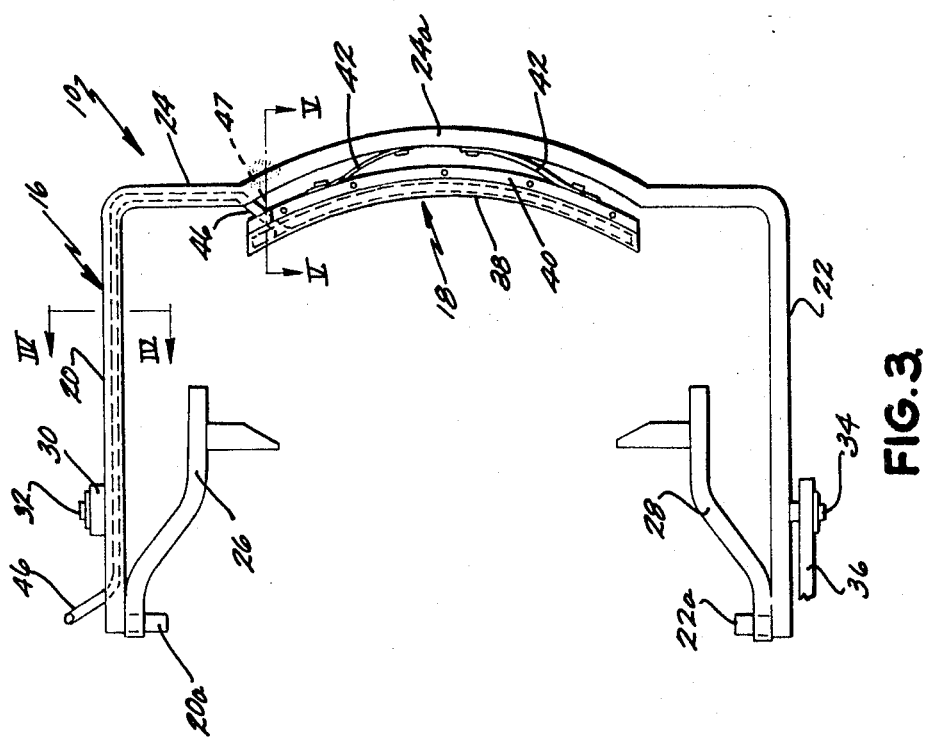
FIG. 3 is an enlarged side elevation of the apparatus.

In the first preferred embodiment of the invention, the cleaning apparatus 10 comprises a frame 16 whose overall shape is of a generally C-shaped configuration (FIG. 3), including upper and lower horizontal frame portions 20, 22, respectively, interconnected by a generally vertical frame portion 24, which preferably has an arcuate central extremity 24a. The end extremities of the upper and lower frame portions 20, 22 carry vertically aligned cylindrical mounting projections 20a, 22a, respectively, as illustrated (FIG. 3). Each of these mounting projections are received within a mounting bracket structure 26, 28 which is itself attached to the automobile, preferably, to the sheet metal work 48 forming the environmental structure for the pair of headlights 12, 14, and upon which such headlights are normally mounted. Thus, the frame 16 is pivotally mounted about the mutual axis of the mounting projections 20a, 22a.

Mounted in this manner, each of the frames 16 in a pair of the same intended for use on a pair of adjacent headlights 12, 14 are ganged together for synchronized movement. That is accomplished by a tie bar 30 (FIGS. 1 and 2) having an annulus at each end which slidably fits over an upstanding cylindrical post member 32 atop of each of the upper frame portions 20. With such a tie bar arrangement, only one of frames 16 in a pair of the same need be driven in order to move both frames in the pair. A convenient form for such a drive includes a generally vertical post 34 (FIG. 3) extending downwardly from the lower frame portion 22, about which fits the annular end of a drive linkage 36, arranged to be driven in a reciprocating manner. As will be recognized, this can be accomplished in any of several ways, as for example by a relatively small electric motor driving an eccentric and yoke mechanism.

The wiper means 18 mentioned hereinabove comprises a resilient wiping strip element 38 (FIGS. 3 and 5) which is generally T-shaped in cross section, having a relatively thin and flexible wiping blade portion 37 extending toward and serving to wipe across the outer face of the headlights. As will be recognized, such a wiper strip may conveniently be produced by forming or extruding rubber or plastic material. The wiper element 38 is mounted in and retained by an elongated upright holder 40 of generally channel-shaped cross section, at least the lower end of which should be closed. With the wiper element 38 made of a yieldable and resilient material, the holder 40 may be of generally rigid construction, permanently formed with the longitudinally curved shape illustrated in FIG. 3. This shape serves to hold the wiper strip 38 in the desired longitudinally curved shape illustrated, since this shape is required in order to properly clean the spherical outer face of the headlight.

The holder 40 is attached to the arcuate central extremity 24a of the vertical frame portion 24 noted previously (FIG. 3), preferably by a pair of relatively thin and resilient leaf spring members 42, attached to the holder and the frame portion at opposite ends in a desired manner, such as by heat staking. As will be recognized, the resilient spring elements 42 will serve to bias the wiper element 38 against the face of the headlights, with a degree of force determined by selection of the spring constant or resiliency of the elements 42. It is to be recognized that there are clearly suitable alternatives to this specific mounting arrangement, however, such as could be provided, for example, by attaching the holder 40 directly to the central extremity 24a of the frame portion and spring-loading the entire frame in the direction of the headlight, or by spring-loading only the wiper strip 38. Also, it may be possible to use the natural resiliency of the wiper strip itself as the primary (or sole) biasing means, and merely mount the resilient wiper directly against the face of the headlight. The principle to be served, however, is well illustrated by the specific embodiment just described.

As previously indicated, the resilient wiper element 38 is of generally T-shaped cross section, including a forwardly protruding blade portion 37 which actually contacts and wipes the outer face of the headlight, and also including a web or body portion 39 (FIG. 5) actually contained within the channel-shaped holder 40. The oppositely disposed side edges of the web portion 39 are slotted at a number of vertically spaced positions, as indicated at 44 (FIG. 6). The slots 44 extend inwardly of the sides of the wiper element a distance sufficient to at least slightly notch the widest part of the blade 37 as well. The slots 44 provide discharge openings for cleaning fluid which is to be applied to the outer face of the headlights in order that the resilient wiper elements may automatically clean the same.

Such cleaning fluids which can be taken from the existing supply used for windshield washer equipment are introduced to the top of the wiper holder 40 by means of a fluid-transfer conduit 46 (FIG. 3), which may conveniently be flexible plastic tubing or the like. Conduit 46 is preferably housed within the open interior of the channel-shaped frame 16 (FIG. 4), entering the latter near the mounting projection 20a of the upper frame portion 20 (FIG. 3), and thus being concealed from view along the length of the upper frame portion and downwardly along the vertical frame portion 24. At the point where the arcuate central extremity 24a of the vertical frame portion begins, the conduit 46 extends outwardly of the frame and enters the wiper holder 40, as through an aperture 47 formed for this purpose.

In accordance with this arrangement, cleaning fluid pumped into the conduit 46, as by a relatively small vacuum-operated fluid pump of a known nature, is pumped directly into the holder 40, behind the resilient wiper element 38, from which position the fluid is forced outwardly through the slots 44 and directly onto the face of the particular headlight involved. Preferably, the reciprocating movement of the frame 16 and of the wiper means carried thereby is synchronized with the operation of the fluid-supplying pump, so that the frame will be reciprocated as soon as cleaning fluid is pumped into the conduit 46 and applied to the headlight; of course the supply of cleaning fluid need not be continued throughout the period in which the wiper is reciprocated across the face of the headlight.

The embodiment of the invention illustrated in FIGS. 1, 2 and 3 is regarded as being the one which will find the most direct applicability in the largest number of cases; however, it is not the only possible embodiment of the invention, and the embodiment illustrated in FIG. 7 is intended to illustrate this fact. Here, the apparatus includes a frame 116 having only an upper frame portion 124, there being no lower frame portion such as is used in the embodiment already described. In this arrangement, the central extremity 124a is preferably pivotally connected to the vertical frame portion 124, as by means of a mounting pin 150, and a torsion spring or the like (not specifically shown) is preferably used to bias the central portion 124a in a clockwise direction with respect to the vertical portion 124, so that the wiper means 18 carried thereby will be pressed against the outer face of the headlight. Most other aspects of this embodiment can be essentially the same as already described, including the nature of the wiper means 18 and of the fluid-transfer conduit, etc. However, the vertical post 134 by which the frame is reciprocatingly driven will, like the drive posts 132, be carried by the upper frame portion 22, inasmuch as there is no lower frame portion.

It is entirely conceivable that upon examining the foregoing disclosure, those skilled in the art may devise particular embodiments of the concepts forming the basis of the invention which differ somewhat from the preferred embodiments shown and described herein, or may make various changes in structural details to the present embodiments. Consequently, it is to be recognized that the preferred embodiments shown and described are for purposes of general illustration only and are in no way intended to illustrate all possible forms of the invention.

The embodiments of the invention in which I claim an exclusive property or priviledge are defined as follows:

1. Apparatus for automated cleaning of automobile and like headlights, comprising in combination: a generally U-shaped frame having a middle portion and a pair of leg members interconnected therewith, said leg members disposed generally parallel to the light axis of said headlight and said middle portion disposed transversely to such axis; at least one of said leg members including structure for movably mounting the frame adjacent a selected headlight; a wiper means carried by said middle portion of said frame and including at least one flexible bladelike element held against the outer surface of such headlight; means for moving said frame upon its mount to move said wiper element across said headlight surface through a number of substantially mutually parallel wiping positions; and cleaning fluid-discharge means arranged to apply such fluid to said headlight surface.

2. The apparatus of claim 1, wherein said cleaning fluid-discharge means is carried at least in part by said frame.

3. The apparatus of claim 2, wherein said discharge means includes a fluid-transfer conduit means carried at least in part by said frame.

4. The apparatus of claim 3, wherein said wiper means includes cleaning fluid-applying portions, and wherein said portions are intercoupled with said conduit means.

5. In combination, a headlight for automobiles and the like, and apparatus for automated cleaning of such headlight, comprising: a headlight having a front wall through which light may shine and structure for mounting the headlight in place; a frame mounted generally adjacent said headlight; said frame having first portions extending generally parallel to the light axis of said headlight and having second portions disposed generally perpendicular to said light axis and forwardly of said headlight wall; wiper means carried by said second frame portions and including a flexible member held against the forward surface of said headlight wall; means for mounting said first frame portions upon a pivot axis disposed rearwardly of said headlight, generally perpendicular to said light axis and intersecting the same; means for moving at least said first frame portions in a pivotal reciprocating arc, to thereby move said wiper member across said headlight wall surface; and cleaning fluid-discharge means arranged to apply such fluid to said headlight surface.